United States Patent [19]

Yamada

[11] Patent Number: 5,266,419
[45] Date of Patent: * Nov. 30, 1993

[54] METHOD OF PRODUCING AN AIR ELECTRODE MATERIAL FOR SOLID ELECTROLYTE TYPE FUEL CELLS

[75] Inventor: Hirotake Yamada, Nagoya, Japan

[73] Assignee: NGK Insulators, Ltd., Japan

[*] Notice: The portion of the term of this patent subsequent to Jul. 13, 2010 has been disclaimed.

[21] Appl. No.: 726,782

[22] Filed: Jul. 8, 1991

[30] Foreign Application Priority Data

Jul. 12, 1990 [JP] Japan ............................ 2-182808

[51] Int. Cl.$^5$ ............................................. H01M 8/10
[52] U.S. Cl. .................................... 429/30; 429/218; 264/44
[58] Field of Search ............................. 429/30, 218

[56] References Cited

FOREIGN PATENT DOCUMENTS

| | | |
|---|---|---|
| 0188868 | 7/1986 | European Pat. Off. . |
| 0194380 | 9/1986 | European Pat. Off. . |
| 0395399 | 10/1990 | European Pat. Off. . |
| 2738756 | 3/1979 | Fed. Rep. of Germany . |
| 2099542 | 3/1972 | France . |
| 2347783 | 3/1972 | France . |
| 2315151 | 1/1977 | France . |

OTHER PUBLICATIONS

1988 The Chemical Society of Japan, pp. 1623–1629, "Electrode Thickness, Microstructure, and Properties of Air Electrode for High-Temperature Solid Oxide Fuel Cells, La$_{0.6}$Ca$_{0.4}$MO$_3$(M=Mn, Co)/YSZ", Junichiro Mizusaki et al. (abstract only).

*Primary Examiner*—Prince Willis, Jr.
*Assistant Examiner*—M. Nuzzolillo
*Attorney, Agent, or Firm*—Parkhurst, Wendel & Rossi

[57] ABSTRACT

A method of producing a self-supporting air electrode for a solid electrolyte fuel cell, including the steps of mixing lanthanum or a lanthanum compound, manganese or a manganese compound, and metal A or a compound thereof into a mixture, wherein A is selected from the group consisting of Sr, Ca, Mg, Y, Ce, Yb, Zn and Ba and pre-firing the mixture at a temperature of at least 1400° C. to yield a synthesized product of La$_{1-x}$A$_x$MnO$_3$ wherein $0 < x \leq 0.5$ and forming the synthesized product into a green body and firing the green body to form a self-supporting air electrode body consisting of La$_{1-x}$A$_x$MnO$_3$.

3 Claims, No Drawings

METHOD OF PRODUCING AN AIR ELECTRODE MATERIAL FOR SOLID ELECTROLYTE TYPE FUEL CELLS

BACKGROUND OF THE INVENTION

1. Field of the Invention

The present invention relates to a method of producing an air electrode material for solid electrolyte type fuel cells.

2. Related Art Statement

Recently, solid electrolyte type fuel cells (usually called "SOFC") have attracted attention as exceedingly promising electric generators having advantages of a high generation efficiency, low public nuisance, and a capability of using diversity of fuels (naphtha, natural gas, methanol, reformed coal gas, etc.).

A current important task in developing SOFC is how to lower an overvoltage of the air electrode, which causes a voltage drop of SOFC.

Causes of over voltage include disturbance of electrode reaction and resistance due to an insulation layer formed on an intersurface between the air electrode and the stabilized zirconia solid electrolyte.

Syntheses of $La_{0.6}Ca_{0.4}MnO_3$ was reported, for example, in Mizusaki et al "Electrode Thickness, Microstructure and Electrode Properties of $La_{0.6}Ca_{0.4}MO_3$ (M=Mn,Co)/YSZ System Air Electrode for High Temperature Solid Oxide Fuel Cells" described on Bulletin of the Chemical Society of Japan, [9], pp 1623-1629, 1988, wherein $La_2O_3$, $CaCO_3$ and $Mn_2O_3$ powders are mixed in a ball mill with ethanol for 24 hours, once pulverized and sieved, again fired at 1,200° C., and pulverized. The thus obtained synthetic $La_{0.6}Ca_{0.4}MO_3$ powder is again pulverized in a mortar, mixed with terebinth oil to form a paste, applied on a surface of a solid electrolyte YSZ pellet, and baked at 1,100° C. for 4 hours to prepare the material $La_{0.6}Ca_{0.4}MnO_3$ of the air electrode. However, the method has a drawback in that cracks are formed in the air electrode due to a difference of thermal shrinkage between the solid electrolyte pellet and the air electrode if the application amount of the paste exceeds 50 mg/cm². Also, reaction products are formed at the intersurface between the solid electrolyte pellet and the material $La_{0.6}Ca_{0.4}MnO_3$ at the time of baking the fuel electrode onto the other surface of the solid electrolyte pellet at a high temperature (e.g., 1,300° C.

On the other hand, instead of providing the coating of the air electrode on the surface of the porous support and sequentially arranging the solid electrolyte and the fuel electrode on the coating, a technique was proposed of using the porous air electrode as the sole structural support. By this technique, the whole structure of SOFC can be simplified as well as the production process, and the production cost can be reduced.

However, even in that technique, cracks are liable to form in the solid electrolyte or the air electrode at the time of coating the solid electrolyte on the surface of the porous air electrode at a high temperature of (e.g. 1,400° C.) and the reaction products are formed at the interface between the solid electrolyte and the air electrode. Moreover, when the self-supporting type porous air electrode is used as the support, the porous air electrode is largely deformed and may shrink if it is exposed to such a high temperature as mentioned above.

SUMMARY OF THE INVENTION

An object of the present invention is to prevent cracks in and peeling between the solid electrolyte or air electrode caused by a difference of thermal shrinkage between the solid electrolyte and the air electrod. Another object is to prevent formation of the highly electric resistant reaction products, such as $La_2Zr_2O_7$, etc., at the interface between the air electrode and the solid electrolyte, when forming the solid electrolyte and the fuel electrode.

Another object of the present invention is to provide a method of producing a material for the air electrode of a self-supporting type for solid electrolyte type fuel cells wherein deformation and shrinkage of the material for the air electrode can be prevented even when the material is exposed to a high temperature.

A further object of the present invention will become apparent from the ensuing descriptions.

The present invention is a method of producing an air electrode material for solid electrolyte type fuel cells, comprising a process of mixing lanthanum or a lanthanum compound, manganese or a manganese compound, and a metal A or a compound of the metal A wherein A is at least one meal selected from the group consisting of Sr, Ca, Mg, Y, Ce, Yb, Zn and Ba, a process of firing the resultant mixture at a temperature of at least 1,400° C. to obtain a synthesized product $La_{1-x}A_xMnO_3$ wherein x is $0 < X \leq 0.5$ and A is as described above, and a process of treating the synthesized product $La_{1-x}A_xMnO_3$ to produce an air electrode material substantially consisting of $La_{1-x}A_xMnO_3$.

DETAILED EXPLANATION OF THE INVENTION

In the present invention, at first, La or a La compound, Mn or a Mn compound, and a metal M or a M compound, are mixed, and the resultant mixture is prefired at a temperature of at least 1,400° C. to obtain a synthesized product $La_{1-x}A_xMnO_3$. The present invention has a significant characteristic feature of effecting the prefiring step of preparing the synthesized product at a higher temperature range than conventional art. By virtue of using the $La_{1-x}A_xMnO_3$ synthesized at a high temperature range, cracks and peeling resulting from a difference of thermal shrinkages between the air electrode material and the solid electrolyte can be prevented from occurring. Further formation of high resistance materials at the interface between the air electrode and the solid electrolyte, even when the air electrode material is heated to a high temperature (e.g., 1,300° C.) Also, if the electrode material is used to prepare a self-supporting type air electrode tube, bending deformation and shrinkage of the self-supporting type air electrode tube can be suppressed, even when the air electrode tube is exposed to a high temperature (e.g., 1,300° C.). Suppresion of deformation and shrinkage is believed to be a result of the prefiring step carried out at a high temperature range of at least 1,400° C. to yield a synthesized product having a low sintering property. Hence the grains or particles of the synthesized product have a low activity at high temperatures.

Firing temperature of 1,500°-1,700° C. at the time of synthesizing the synthesized product is more preferable.

Before synthesizing the synthesized product by prefiring, a kneaded mixture of the raw materials powders is preferably subjected to press molding, extrusion forming, vacuum extrusion or the like compression molding to make the bulk density of the mixture to at least 40% of the intrinsic density, in order to further increase gas permeability and mechanical strength of the final product, the air electrode material.

Next, the process of treating the synthesized product $La_{1-x}A_xMnO_3$ to prepare the air electrode material will be explained.

In the case of when the self-supporting type air electrode body (tubular shape, plate shape, etc.), the synthesized product is at first pulverized preferably to an average grain size of 1–10 μm. If the pulverized powder has an average grain size of less than 1 μm, the resultant air electrode body becomes so dense that a desired porosity of at least 20% can hardly be obtained. If the pulverized powder has an average grain size exceeding 10 μm, the mechanical strength of the air electrode body becomes insufficient.

Namely, the thus obtained powder is added with water and an organic binder, formed into a desired shape, and subjected to a final firing to prepare the air electrode body of a desired shape. A coating of a solid electrolyte zirconia is provided on a surface of the air electrode body at a high temperature of, e.g., 1,400° C. and a coating of a fuel electrode is provided.

Alternatively, the coating of the synthesized product may be formed on the surface of the porous support zirconia to prepare the coating type air electrode material. Alternatively, the solid electrolyte zirconia and the fuel electrode are superposed to preliminarily form an integrated body, and the coating of the above synthesized product may be provided on the surface of the solid electrolyte zirconia to prepare the coating type air electrode.

In these cases, there are a few methods of forming the coating of the synthesized product. For example, similarly as in the case of preparing the above described self-supporting type air electrode body, the synthesized product is pulverized preferably to a fineness of an average grain size of 1–10 μm, the resultant powder is added with water, a binder and a pore-increasing agent to prepare a slurry, the thus obtained slurry is applied on the surface of the porous support zirconia or the solid electrolyte zirconia, and then subjected to the final firing to obtain the coating type air electrode. In an alternative method, the coating of the synthesized product is provided on a surface of the porous support zirconia or the solid electrolyte zirconia by thermal melt spray or vapor deposition, etc.

In the abovementioned methods, when finally firing the kneaded mixture or the slurry to prepare the air electrode material, the firing temperature is preferably 1,300°–1,800° C., more preferably 1,500°–1,800° C. If the firing temperature is less than 1,300° C., sintering of the kneaded mixture or the slurry is incomplete, thus decreasing the strength of the air electrode material. If the firing temperature exceeds 1,800° C., the air electrode material becomes too dense to obtain a desired air-penetration property.

In the synthesized product $La_{1-x}A_xMnO_3$, x is defined as $x \leq 0.5$, in order to make the thermal expansion coefficient of the air electrode material approach that of the solid electrode zirconia.

DESCRIPTION OF THE PREFERRED EMBODIMENTS

Hereinafter, the present invention will be explained in more detail with reference to examples.

EXAMPLE 1

Preparation of the air electrode material $La_2O_3$, $Mn_3O_4$ and $SrCO_3$ of desired amounts are mixed in a wet type mixer, dried, disintegrated, added with a binder, and extruded to a columnar green body of a diameter of 60 mm and a height of 200 mm. Bulk density is 50% of intrinsic density.

The green body is prefired at a temperature of 1,100° C., 1,200° C., 1,300° C., 1,400° C., 1,500° C. or 1,600° C. to synthesize synthesized products $La_{0.8}Sr_{0.2}MnO_3$, and the synthesized products are respectively pulverized in a ball mill to a fineness of an average grain size of 4–6 μm.

The thus obtained powders are added with an organic binder and water, press formed into bodies of a shape of a length of 200 mm, a width of 100 mm and a height of 10 mm, and fired to obtain fired bodies of porosities of around 25% and 35%. In this case, the final firing temperature is adjusted such that the finally obtained air electrode materials have a porosity of 25% or 35%.

Then, a sample of a columnar shape of a diameter of 20 mm and a height of 2 mm is cut out from each of the above fired bodies, and applied with a coating of a 8 mole solid electrolyte zirconia to a thickness of 100 μm by plasma spray. Then, the laminated disc shaped samples are heat treated at 1,300° C. (which is a temperature of the later described forming of the fuel electrode), and left to cool. The cooled samples are checked for presence in cracks of the air electrode or in the solid electrolyte coating caused by a difference of thermal shrinkage between the air electrode and the solid electrolyte coating. The results are shown in the following Table 1.

TABLE 1

| Prefiring temperature (°C.) | 1100 | | 1200 | | 1300 | | 1400 | | 1500 | | 1600 | |
|---|---|---|---|---|---|---|---|---|---|---|---|---|
| Final firing temperature (°C.) | 1420 | 1380 | 1455 | 1420 | 1495 | 1455 | 1540 | 1500 | 1590 | 1545 | 1640 | 1590 |
| Porosity (%) | 25.1 | 34.9 | 25.2 | 35.0 | 25.2 | 35.1 | 25.1 | 34.8 | 24.8 | 35.2 | 25.0 | 35.3 |
| Cracks | X | X | X | X | ○ | X | ○ | ○ | ○ | ○ | ○ | ○ |

Note: the symbol ○ means non-presence, the symbol X means presence

As seen from the results in the above Table 1, cracks are not formed in the solid electrolyte film, when the prefiring temperature of the synthesized product is at least 1,400° C.

EXAMPLE 2

In the same manner as described in Example 1, fired bodies of a porosity of around 25% or 35% are obtained.

Then, a sample of a columnar shape of a length of 20 mm, a width of 20 mm and a thickness of 2 mm is cut out from each of the above air electrode materials, and coated at a surface with a slurry of 8 mole $Y_2O_3$ stabilized zirconia by brushing.

Thereafter, the coated samples are fired at 1,300° C. for 5 hours, and left to cool. The cooled samples are checked for formation of the reaction product $La_2Zr_2O_7$ at the interface between the air electrode and the solid electrolyte film. The results are shown in the following Table 2.

TABLE 2

| Prefiring temperature (°C.) | 1100 | | 1200 | | 1300 | | 1400 | | 1500 | | 1600 | |
|---|---|---|---|---|---|---|---|---|---|---|---|---|
| Porosity (%) | 25.1 | 34.9 | 25.2 | 35.0 | 25.2 | 35.1 | 25.1 | 34.8 | 24.8 | 35.2 | 25.0 | 35.3 |
| Reaction product | X | X | X | X | X | X | ○ | ○ | ○ | ○ | ○ | ○ |

Note: the symbol X means presence of the reaction product, and the symbol ○ means non-presence of the reaction product As seen from the results in Table 2, the reaction product or the reaction at the interface between the air electrode material and the solid electrolyte zirconia of the finally obtained product can be obviated, when the prefiring temperature at the time of synthesis is at least 1,400° C.

EXAMPLE 3

In the same manner as described in Example 1, fired bodies of a porosity of around 25% or 35% are obtained.

Then, a strip-shaped sample of a height of 3 mm, a width of 2 mm and a length of 200 mm is cut out from each of the above air electrode materials. Then, each strip-shaped sample is supported by two supporting points. The two supporting points are set to have a distance of 120 mm.

The samples are held in this state at 1,300° C. for 5 hours. By this heat treatment, the central portions of the strip-shaped samples are bent downwardly by its own weight, so that the whole samples are deformed in shape to a recessed state. Therefore, the strip-shaped samples are measured for displacement or deformation of the central portion from the original non-deformed position. The results are shown in the following Table 3.

TABLE 3

| Prefiring temperature (°C.) | 1100 | | 1200 | | 1300 | | 1400 | | 1500 | | 1600 | |
|---|---|---|---|---|---|---|---|---|---|---|---|---|
| Porosity (%) | 25.1 | 34.9 | 25.2 | 35.0 | 25.2 | 35.1 | 25.1 | 34.8 | 24.8 | 35.2 | 25.0 | 35.3 |
| Deformation (mm) | 57.4 | 66.1 | 42.6 | 51.6 | 29.5 | 35.6 | 13.7 | 19.8 | 1.6 | 11.0 | 0.1 | 0.2 |

A permissible limit of deformation upon firing of the self-supporting type air electrode tube is 20 mm from a viewpoint of practical use, so that the deformations of the strip-shaped samples are within the permissible limit when the prefiring temperature is at least 1,400° C.

EXAMPLES 4-6

The amount of addition of Sr in the synthesized product $La_{0.8}Sr_{0.2}MnO_3$ of Examples 1-3 is changed to obtain synthesized products $La_{1-x}Sr_xMnO_3$ (wherein x=0.1, 0.3, 0.4 or 0.5), and substantially the same results as in the cases of Examples 1-3 are obtained.

Also, instead of Sr as the doping agent metal A, calcium, magnesium, yttrium, cerium, ytterbium, zinc, or barium may be used in the green body for preparing the air electrode material, and substantially the similar results as described above are obtained.

According to the method of the present invention, a mixture of raw-materials of the air electrode material is prefired at a temperature of at least 1,400° C. to obtain the synthesized product $La_{1-x}A_xMnO_3$, so that the synthesized product has a low sintering property and the grains of the synthesized product have a low activity at high temperatures. By using such synthesized product to prepare the air electrode material, cracks and peeling of the solid electrolyte due to a difference of thermal expansions between the air electrode and the solid electrolyte can be prevented. Further formation of high resistance materials at the interface between the air electrode and the solid electrolyte, even when the air electrode material is heated to a high temperature (e.g., 1,300° C.) is prevented. Moreover, when the self-supporting type air electrode body is prepared using the air electrode material, deformation and shrinkage of the air electrode can be suppressed, even if it exposed to high temperatures.

Although the present invention has been explained with reference to specific values and embodiments, it will of course be apparent to those skilled in the art that the present invention is not limited thereto and many variations and modifications are possible without departing from the broad aspect and scope of the present invention as defined in the appended claims.

What is claimed is:

1. A method of producing a self-supporting air electrode for a solid electrolyte fuel cell, comprising the steps of:
    mixing lanthanum or a lanthanum compound, manganese or a manganese compound, and metal A or a compound thereof into a mixture, wherein A is selected from the group consisting of Sr, Ca, Mg, Y, Ce, Yb, Zn and Ba;
    pre-firing the mixture at a temperature of at least 1400° C. to yield a synthesized product of $La_{1-x}A_xMnO_3$ wherein $0<x\leq0.5$;
    forming the synthesized product into a green body; and
    firing said green body to form a self-supporting air electrode body consisting of $La_{1-x}A_xMnO_3$.

2. A method of producing a self-supporting air electrode for a solid electrolyte fuel cell, comprising the steps of:
    mixing lanthanum or a lanthanum compound, manganese or a manganese compound, and metal A or a compound thereof into a mixture, wherein A is selected from the group consisting of Sr, Ca, Mg, Y, Ce, Yb, Zn and Ba;
    forming the mixture into a first green body;
    pre-firing said first green body at a temperature of at least 1400° C. to yield a synthesized product of $La_{1-x}A_xMnO_3$ wherein $0<x\leq0.5$;
    pulverizing said synthesized product into a powder;
    forming said powder into a second green body;
    firing said second green body to form a self-supporting air electrode consisting of $La_{1-x}A_xMnO_3$.

3. The method of claim 2, wherein said powder has an average particle size of 1-10 μm.

* * * * *